United States Patent
Sulzbach et al.

(10) Patent No.: US 6,615,700 B2
(45) Date of Patent: Sep. 9, 2003

(54) METHOD AND SAWING DEVICE FOR REMOVING SECTIONS OF DEFINED LENGTH FROM A CONTINUOUSLY MANUFACTURED EXTRUDED PANEL COMPOSED OF A RIGID FOAM CORE DISPOSED BETWEEN TWO OUTER LAYERS

(75) Inventors: Hans-Michael Sulzbach, Königswinter (DE); Hans-Walter Schug, Lohmar (DE)

(73) Assignee: Hennecke GmbH, Leverkusen (DE)

( * ) Notice: Subject to any disclaimer, the term of this patent is extended or adjusted under 35 U.S.C. 154(b) by 0 days.

(21) Appl. No.: 09/804,789

(22) Filed: Mar. 13, 2001

(65) Prior Publication Data

US 2001/0025555 A1 Oct. 4, 2001

(30) Foreign Application Priority Data

Mar. 15, 2000 (DE) .......................... 100 12 548

(51) Int. Cl.[7] .................................. B26D 3/00
(52) U.S. Cl. ................. 83/39; 83/353; 83/318
(58) Field of Search ................. 83/39, 37, 318, 83/319, 320, 353, 26, 820

(56) References Cited

U.S. PATENT DOCUMENTS

| 3,732,761 A | * | 5/1973 | Sanders ...................... 83/37 |
| 3,745,864 A | * | 7/1973 | Watson ...................... 83/295 |
| 3,837,246 A |   | 9/1974 | Juditzki ...................... 83/26 |
| 4,854,208 A |   | 8/1989 | Aoyagi ...................... 83/862 |
| 5,107,738 A |   | 4/1992 | Aoyagi ...................... 83/820 |

FOREIGN PATENT DOCUMENTS

| DE | 35 00 751 | | 7/1986 |
| DE | 0447892 A1 | * | 3/1991 |

\* cited by examiner

*Primary Examiner*—Paul T. Sewell
*Assistant Examiner*—M. Chambers
(74) *Attorney, Agent, or Firm*—Joseph C. Gil; Lyndanne M. Whalen

(57) ABSTRACT

From an extruded panel manufactured continuously by means of a twin-belt conveyor, shorter sections may be profitably removed by a cutting device equipped with an adjustable program controller which fixes optimum start-of-cut positions related to a reference point and lying immediately in front of the edges of the extruded panel. The cutting blade is brought into the optimum start-of-cut position in good time before each cut.

10 Claims, 4 Drawing Sheets

METHOD AND SAWING DEVICE FOR REMOVING SECTIONS OF DEFINED LENGTH FROM A CONTINUOUSLY MANUFACTURED EXTRUDED PANEL COMPOSED OF A RIGID FOAM CORE DISPOSED BETWEEN TWO OUTER LAYERS

BACKGROUND OF THE INVENTION

The present invention relates to a method and a device for removing sections of defined length from a continuously manufactured extruded panel composed of a rigid foam core disposed between two outer layers.

In the known methods for removing sections from a continuously produced panel, a sawing device is brought with its saw blade into cutting position and displaced at the feed rate of the extruded panel parallel to the latter and simultaneously transversely for removal of a section. After the cut, the saw blade is turned and moved back, then brought once more into cutting position and displaced at the feed rate of the extruded composition parallel to the latter and simultaneously transversely in the opposite direction for removal of the next section, and so on (DE 35 00 751 C2).

Extruded panels and/or panel sections with a rigid foam core generally have sheet-metal outer layers or less rigid outer layers such as, for example, roofing felt, cardboard, or paper. Particularly in the case of metal outer layers, the edges often extend beyond the rigid foam core and are profiled so that the individual sections may be assembled to form, for example, walls or roofs.

Apart from the nature of the outer layers and the thickness of the rigid foam core, sections are required in various lengths and widths and this makes cost-effective production difficult. Manufacture of the extruded panel is carried out on a "so-called" twin-belt conveyor, which has a sawing device disposed downstream thereof.

The cutting speed depends upon the nature of the outer layers and is adjustable without taking up too much time. Tearing of the outer layers by the saw blade, which may occur as a result of selecting the incorrect (usually too high) cutting speed, should be avoided. The cut is therefore usually started at a lower speed and then increased. Towards the end of the cut, the cutting speed is reduced again. During the cutting process, the extruded panel is being continuously manufactured in the usual manner at a constant feed rate without interruption. In the course of each feed travel, which corresponds to the length of a section portion to be removed, both the cutting operation and the return travel of the saw have to be completed.

The twin-belt conveyor should be adjusted to the width of the extruded panel to be produced in each case. In the case of the sawing device, which is designed for the maximum extruded panel width, a great deal of time is wasted in transverse travel before and beyond the actual cut. Such wasted time adds up to the time available to the sawing device for the return travel. As a result, the removal of panel sections below a specific minimum length has been considered to be impossible.

The entire transverse travel path of the sawing device could, of course, be adapted to the respective extruded panel width. It would then be possible to remove extruded panel sections of smaller length but the necessary modification time is considerable and therefore prohibitive. Modification for small production runs is also uneconomical.

SUMMARY OF THE INVENTION

It is an object of the present invention to provide a device and a method for removing sections of defined length from a continuously produced extruded panel, which saves some of the transverse travel time of the cutting device and does not require the considerable modification times required in the known processes, thereby making it possible to remove extruded sections of very small length, and indeed also within a smaller production run, in a profitable manner.

These and other objects which will be apparent to those skilled in the art are achieved by the present invention in which an adjustable program controller fixes optimum start-of-cut positions relative to a reference point and immediately in front of the edges of the extruded panel for each section to be removed. The cutting device is immediately moved back after the cut section has been removed and, in the process, the cutting blade is positioned (e.g., by turning) for making the next cut. The cutting device is brought into the next optimum start-of-cut position during the return travel.

DETAILED DESCRIPTION OF THE INVENTION

Figure 1:
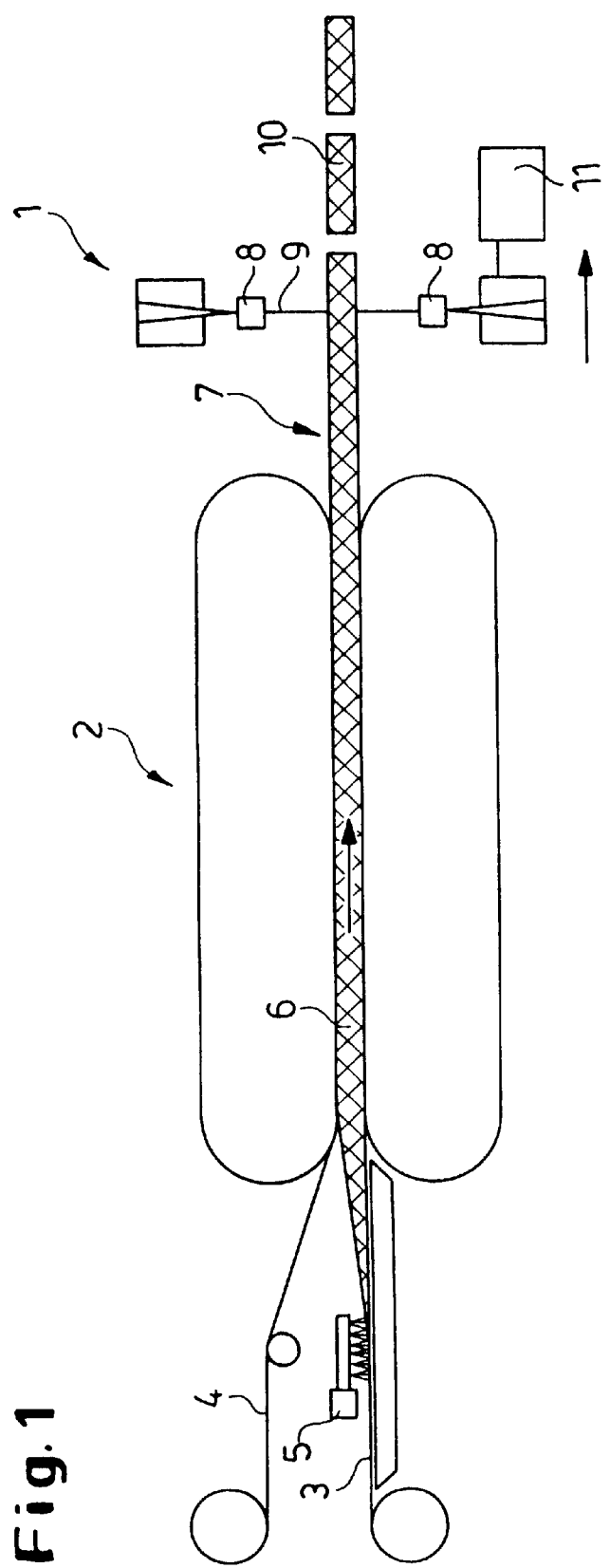
FIG. 1 is a side view of the cutting device for removing defined panel sections from an extruded panel continuously produced on a twin-belt conveyor.

The device and method of the present invention are useful for removing sections from a continuously produced extruded panel having a rigid foam core and two outer layers. Any of the known rigid foams may be used as the foam core in the panels cut in accordance with the present invention. Polyurethane foams are particularly suitable. The outer layers of the extruded panels which are cut in accordance with the present invention may be made of any of the materials commonly used to produce such panels. Examples of suitable materials for such outer layers include sheet metal, roofing felt, cardboard and paper.

In the present invention, the start-of-cut position is, in each case, the point immediately in front of the edge of the extruded panel and/or immediately in front of the start of cut. By repositioning the cutting blade during the return travel time (if repositioning is necessary), the total time between two cuts is shorter, so that even very short sections may be removed effectively.

Preferably, during adjustment of the start-of-cut position to determine the optimum, a safety margin from the edges of the extruded panel is added.

Inclusion of a safety margin avoids accidental biting of the cutting blade into the outer layers and damage to the outer layers. Theoretically, the start-of-cut position for each cut is precisely at the side edge of the extruded panel. However, in practice, it is advantageous to select, in each case, a safety margin from the edge of the extruded panel of a few millimeters, usually from about 3 to about 6 mm. The safety margin is also dependent upon the extent to which the upstream twin-belt conveyor causes and/or allows transverse drifting of the extruded panel. It is naturally helpful for optimization to keep any safety margin as small as possible.

It is readily apparent that the appropriate values for each type of extruded panel must first be determined and input into the program controller. Such determination and input admittedly entail an outlay which quickly pays for itself due to the constantly recurring range of panel sections to be manufactured.

The start-of-cut position is preferably detected by sensor equipment which is set to that position. That is, during return travel of the cutting device, when the cutting blade reaches the point for the optimum start-of-cut position, to which the sensor equipment has been set by the program controller, the transverse travel of the sawing device is halted so that the cutting blade is situated exactly in the optimum start-of-cut position. The cutting blade should be in the optimum start-of-cut position no later than completion of the return travel of the sawing device.

Alternatively, the optimum start-of-cut position situated immediately in front of the edge of the extruded section may be detected by a position measuring system set to a preselected position. That is, during return travel of the cutting device, when the cutting blade reaches the optimum start-of-cut position, to which the position measuring system has been set by the program controller, the transverse travel of the cutting device is halted so that the cutting blade is situated exactly in the start-of-cut position. The cutting blade should be in the start-of-cut position at the latest on completion of the return travel of the sawing device.

Whether sensor equipment or a position measuring system is used, the sooner the saw blade is situated in the start-of-cut position, the shorter the panel sections which may be removed.

In one embodiment of the present invention, the cutting blade and a deburring device disposed downstream thereof are each moved far enough away from the extruded panel after cutting that both may be turned together. In this embodiment, turning of the cutting blade (if necessary) may be started as soon as the deburring device has left the region of the extruded panel.

Any of the known deburring devices may be used in the present invention.

It is readily apparent that the cutting blade should rotate only during the cutting operation because each unnecessary rotation causes the blade to wear.

The cutting device for removing sections of defined length from an extruded panel continuously produced on an upstream twin-belt conveyor which is composed of a rigid foam core disposed between two outer layers of the present invention is displaceable with and parallel to the extruded panel at the feed rate of the extruded panel during the removal of a panel section. The cutting device is capable of return travel at increased speed during removal of a panel section. The cutting blade of the cutting device may be turned around (if necessary) after the removal of a panel section.

A key feature of the cutting device of the present invention is that the optimum start-of-cut position(s) may be adjusted by means of a program controller and position sensing elements.

At the optimum start-of-cut position, the cutting blade is poised for the next cut, optionally with a safety margin from the edges of the extruded panel. Thus, in terms of equipment, the precondition for manufacturing very short sections is created with minimal setting times. Suitable cutting devices include any of the known sawing devices, particularly, sawing devices with a continuous saw blade that is capable of turning round and rotating via guide pulleys, and sawing devices having a disk-like circular saw blade.

The position sensing elements used in the practice of the present invention preferably comprise sensor equipment. Suitable sensor elements are described, for example, in the brochures of the company Gebhard Baluff GmbH & Co., Gartenstr. 21–25, D-73765 Neuhausen/Filder, No. 8124464 D, edition 9804, in particular page 2.3, as well as No. 817545, edition 9910.

Alternatively, the position sensing elements may be a position measuring system. Suitable position measuring systems are described, for example, in brochure No. 811506 D, edition 9801, of the Gebhard Baluff company.

The apparatus of the present invention is illustrated in FIGS. 1–3 and 5 by way of example and purely diagrammatically with reference to the method of the present invention.

In FIG. 1, there is disposed upstream of cutting device 1 twin-belt conveyor 2. Into conveyor 2, bottom outer layer 3 and top outer layer 4 both made of sheet metal are introduced. A polyurethane reaction mixture which forms rigid polyurethane foam is applied by means of mix head 5 onto bottom outer layer 3. This reaction mixture expands between outer layers 3 and 4 into rigid foam core 6 thereby producing continuous extruded panel 7. Cutting device 1 comprises turning apparatus 8 for cutting blade 9. The removed panel sections are denoted by 10 and an indicated program controller is denoted by 11.

Figure 2:
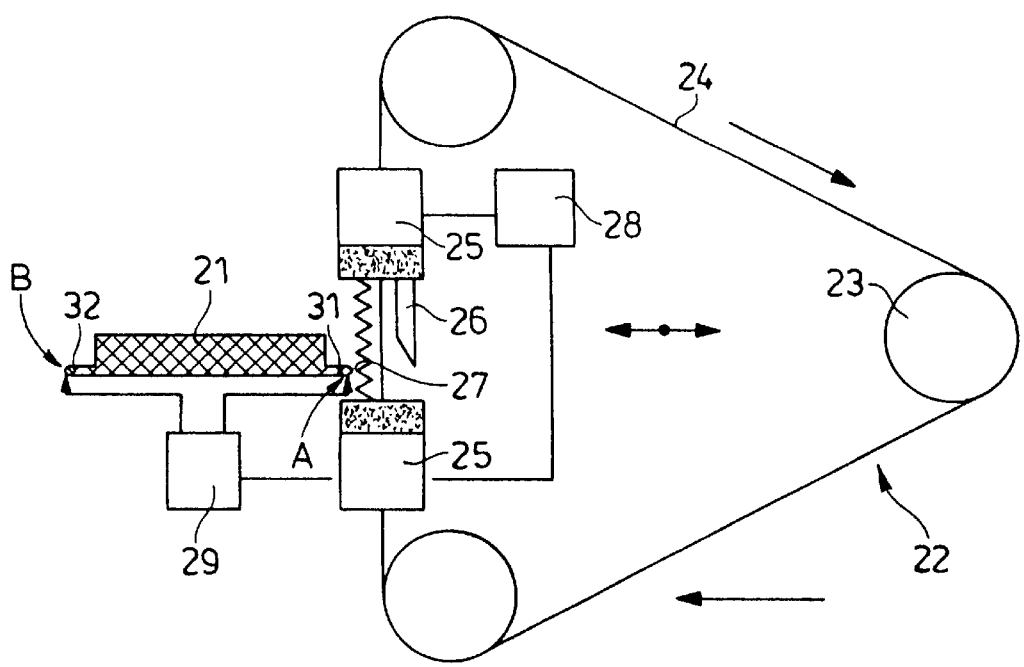
FIG. 2 is a sectional view of the cutting device plus deburring device in the optimum right hand start-of-cut position with indicated sensor equipment.

In FIG. 2, a cutting device 22 for removing panel sections of defined length is associated with extruded panel 21. Saw blade 24 rotates via pulleys 23 and is turned after each cut, so that each time saw blade 24 travels across the extruded panel 21 a cut may be effected. Associated with saw blade 24 is turning apparatus 25 on which deburring apparatus 26 is disposed. Saw blade 24 is situated in the optimum start-of-cut position immediately in front of the right edge 27 of extruded panel 21 for cutting through the latter from right to left. The right hand start-of-cut position A is adjusted by means of program controller 28 which is referred to the center line of extruded panel 21 as a reference point, using a position sensing system in the form of sensor equipment 29.

Figure 3:
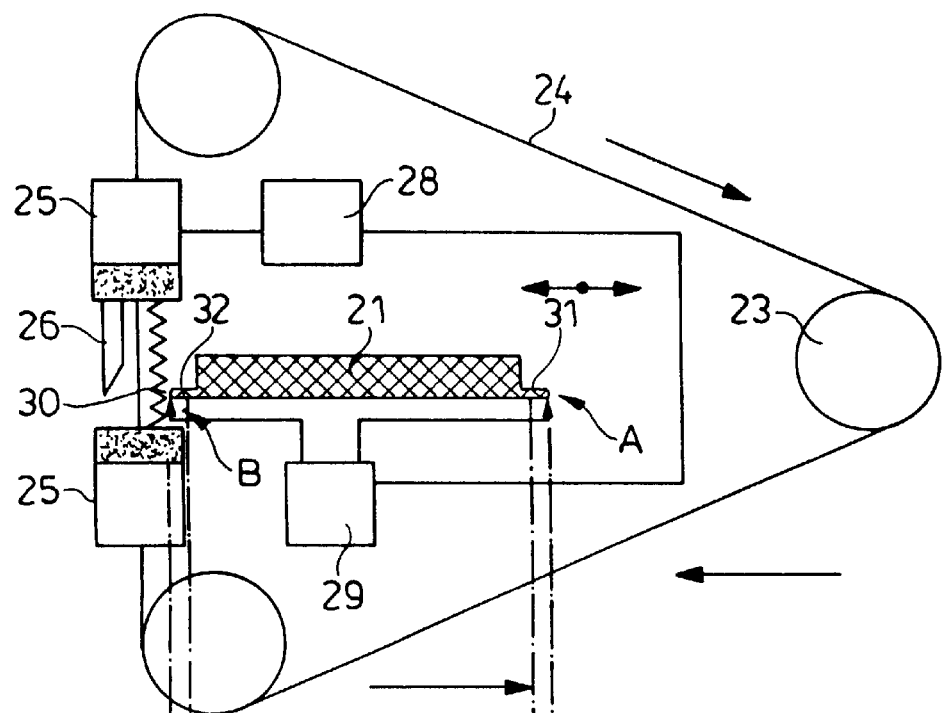
FIG. 3 is a sectional view of the cutting device plus deburring device according to FIG. 2 in the optimum left hand start-of-cut position with sensor equipment.

In FIG. 3, saw blade 24 of cutting device 22 rotating via pulleys 23 is situated in the optimum left hand start-of-cut position B immediately in front of the left edge 30 for cutting through extruded panel 21 from left to right. Here too, the left hand optimum start-of-cut position B is adjusted by means of program controller 28 using a position sensing system in the form of sensor equipment 29. Here too, the turning apparatus is denoted by 25 and the deburring device by 26.

Figure 4:
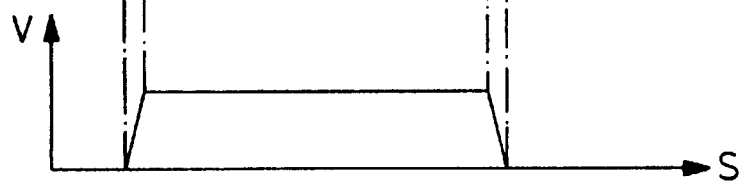
FIG. 4 is a path-time diagram for the cutting speed relative to the device illustrated in FIG. 3.

FIG. 4 shows a path-time diagram which is related to FIG. 3. In FIG. 4, it is shown that the cutting speed (V) at the beginning and at the end of the path (S) through the extruded panel 21 is slower than in the middle. The slower speed coincides with the thinner end zones 31 and 32 of the extruded panel, although this need not be the case. It is important for the initial cutting speed and the final cutting speed to be selected so as to avoid tearing of the edges of the extruded panel 21 during cutting.

Figure 5:
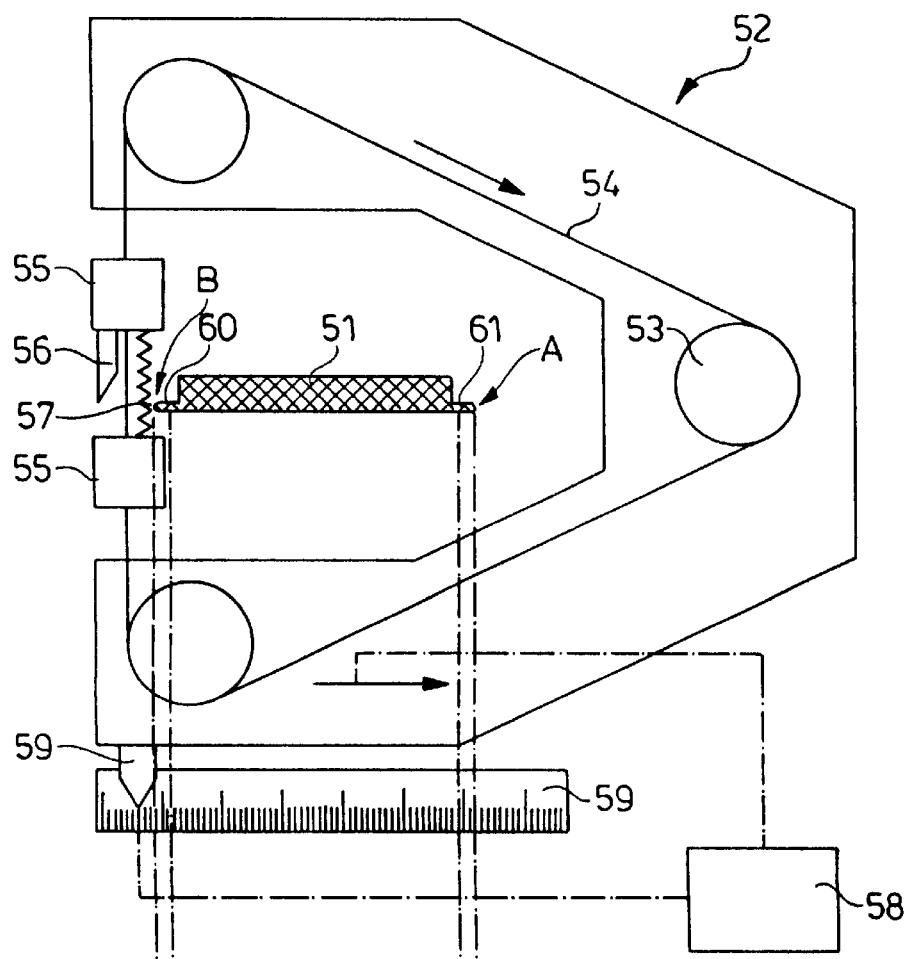
FIG. 5 is a slightly more detailed sectional view of the cutting device plus deburring device in the left hand optimum start-of-cut position with indicated position measuring system.

In FIG. 5, cutting device 52 for removing panel sections of defined length is associated with extruded panel 51. Saw blade 54 rotates via pulleys 53 and is turned after each cut so that each time it travels across extruded panel 51 a cut may be effected. Associated with saw blade 54 is turning apparatus 55 on which deburring device 56 is disposed. Saw blade 54 is situated in the left hand optimum start-of-cut position B immediately in front of the left edge 57 of extruded panel 51 for cutting through the panel from left to right. The start-of-cut position B is adjusted by means of program controller 58, which is referred to the center line of the extruded panel 51 as a reference point, using a position sensing system in the form of position measuring system 59. The optimum cutting position on the other side of the extruded section width is denoted by A.

Figure 6:
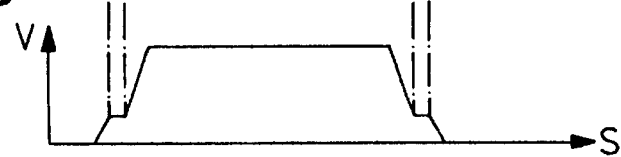
FIG. 6 is a path-time diagram for the cutting speed relative to the device illustrated in FIG. 5.

FIG. 6 shows the path-time diagram related to FIG. 5. Here, the optimum start-of-cut position B is adjusted with a safety margin of 4 mm from the left edge 57 of the extruded panel 51. In the region of the safety margin, the initial speed of saw blade 54 is first increased and then kept constant during cutting of thin edge zone 60. It is then increased again and subsequently kept constant over the greatest part of the width of extruded panel 51. Finally the cutting speed is decreased mirror-symmetrically. That is, the cutting speed is initially reduced towards the end of the extruded panel, then kept constant over the width of edge zone 61 and decreased in the following region of the safety margin back down to zero. Thus, tearing of the extruded panel 51 is avoided.

For the sake of clarity, none of the drawings show the safety margins of the optimum start-of-cut positions from the edges of the extruded section, particularly as this is easily imaginable.

It is readily apparent that there is no need to show the cutting device 52 with its saw blade 54 in the optimum start-of-cut position A in front of the right edge 61 of the extruded section 51 because of the meaningfulness of the substantially similar FIG. 2. The same applies to the mirror-symmetrically situated, right optimum start-of-cut position A of extruded panel 31 (FIG. 3).

Although the invention has been described in detail in the foregoing for the purpose of illustration, it is to be understood that such detail is solely for that purpose and that variations can be made therein by those skilled in the art without departing from the spirit and scope of the invention, except as it may be limited by the claims.

What is claimed is:

1. A method for removing a section of defined length from a continuously manufactured extruded panel comprising a rigid foam core disposed between two outer layers comprising:
    a) bringing a cutting device with its cutting blade into cutting position,
    b) cutting the extruded panel in a manner such that the cutting blade is displaceable with and parallel to the extruded panel at the same rate as the feed rate of the extruded panel to remove a section of the extruded panel,
    c) positioning the cutting blade while moving it back into cutting position, to begin the next cut, if necessary, and
    d) returning the cutting device with its cutting blade to an optimum start of cut position fixed by an adjustable program controller, and
    e) repeating steps b), c) and d).

2. The method of claim 1 in which a safety margin is added to the theoretical optimum start-of-cut position.

3. The method of claim 1 in which the optimum start-of-cut position is detected by sensor equipment set to that position.

4. The method of claim 1 in which the optimum start-of-cut position is detected by a position measuring system set to that position.

5. The method of claim 1 in which the cutting device includes a saw blade and a deburring device disposed downstream of that blade and the blade and deburring device are each moved far enough out from the extruded composition after the extruded panel has been cut that they may be turned together.

6. The method of claim 1 in which the cutting device employed is a sawing device.

7. A device for removing a section of defined length from an extruded panel manufactured continuously on an upstream twin-belt conveyor which panel comprises a rigid foam core disposed between two outer layers comprising
    (1) a cutting device which
        (a) is displaceable with and parallel to the extruded panel at the feed rate of the extruded panel,
        (b) is capable of return travel at increased speed after a section of the extruded panel has been cut,
        (c) has a blade capable of being returned to cutting position after removal of a section of the extruded panel,
    (2) a position sensing element to detect when the blade is in optimum start-of-cut position and
    (3) a program controller to determine the optimum start-of-cut position.

8. The device of claim 7 in which the position sensing element comprises sensor equipment.

9. The device of claim 7 in which the position sensing element comprises a position measuring system.

10. The device of claim 7 in which the cutting device is a sawing device.

* * * * *